United States Patent Office 3,244,474
Patented Apr. 5, 1966

3,244,474
METHOD OF MAKING NITRYL PERCHLORATE AND NITROSYL PERCHLORATE
Carl W. Schoenfelder, Wharton, and Murray S. Cohen, Convent Station, N.J., assignors to Thiokol Chemical Corporation, Bristol, Pa., a corporation of Delaware
No Drawing. Filed Feb. 21, 1961, Ser. No. 91,299
3 Claims. (Cl. 23—14)

This invention relates to a novel method for the preparation of nitryl perchlorate, $NO_2ClO_4$, nitrosyl perchlorate, $NOClO_4$, and mixtures of these materials.

Both nitryl perchlorate and nitrosyl perchlorate are strong oxidizing agents, and find use as the oxidizing component in rocket fuel mixtures. Thus, the materials, alone or in combination, can be used in oxidizing mixtures for the propulsion of liquid propellant rockets where the liquid fuel is, for example, hydrazine. The oxidizers can also be used with a solid fuel such as aluminum hydride in a solid propellant grain as the oxidizing constituent thereof. Rocket propellant systems of the type described are known in the art, and are disclosed, for example, in the book, "Rocket Propellants," by Francis A. Warren, Reinhold Publishing Corp., New York, 1958.

The substances can also be used as convenient sources for generating mixtures of nitric and perchloric acids, e.g., by addition of water.

It has now been found that nitryl perchlorate can be conveniently prepared from liquid reagents by reacting nitric acid with chlorine heptoxide. The reaction proceeds according to the following equation:

(I)   $Cl_2O_7 + HNO_3 \rightarrow NO_2ClO_4 + HClO_4$

In turn, nitrosyl perchlorate may be formed in the reaction mixture by reaction of perchloric acid produced in (I) with nitric acid according to the scheme:

(II)   $2HClO_4 + 2HNO_3 \rightarrow 2NOClO_4 + 2H_2O + O_2$

Excess water can be removed by using a dehydrating agent such as $P_2O_5$ and changing the stoichiometry to produce only water in situ. The reaction then follows the equation:

(III)   $Cl_2O_7 + 2HNO_3 + \tfrac{1}{3}P_2O_5 \rightarrow \tfrac{2}{3}H_3PO_4 + 2NO_2ClO_4$ The $H_3PO_4$ formed can subsequently be removed by solvent extraction.

The chlorine heptoxide employed in Reaction I is conveniently prepared by slowly adding perchloric acid to solid phosphorus pentoxide, for example by dropwise addition, preferably cooled to a temperature near $-78°$ C., at which temperature the acid added will freeze on addition to the vessel used. The mixture of perchloric acid and phosphorus pentoxide is then gradually warmed over a period of 6–20 hours, during which time the reactants combine slowly to produce chlorine heptoxide:

(IV)   $2HClO_4 + P_2O_5 \rightarrow Cl_2O_7 + 2HPO_3$

The initial cooling temperatures are not critical, but are suitably employed to permit slow, controlled reaction of the starting materials.

The $Cl_2O_7$ obtained is suitably separated from the reaction mixture by vacuum distillation at a temperature below about 50° C. It is convenient to distill the heptoxide directly into anhydrous nitric acid, without isolation of the liquid heptoxide. Although the heptoxide and nitric acid can be successfully combined at room temperature, the use of low temperatures is recommended to reduce the danger of explosion. Again, for convenience, a bath at $-78°$ C. is usually employed as a refrigerant, but other low temperatures can also be used.

Nitric acid and chlorine heptoxide react to form a white solid which is a mixture of anhydrides of nitric acid and perchloric acid. The solid can be purified by sublimation to separate the predominant product, nitryl perchlorate. As mentioned, if excess nitric acid is present when contacted with chlorine heptoxide, nitrosyl perchlorate may be formed by Reaction II shown above. The generation of water in this reaction in turn hydrolyzes additional nitryl perchlorate to nitric acid and perchloric acid, which then may react to form still more nitrosyl perchlorate. Thus, if nitryl perchlorate is desired as the predominant product, it is preferred to react chlorine heptoxide and nitric acid in approximately 1:1 molar ratio, to have the chlorine heptoxide in excess, or to conduct the reaction in the presence of a dehydrating agent.

Mixtures of nitryl perchlorate and nitrosyl perchlorate can be fractionally crystallized from nitromethane as reported in the literature by Goddard, Hughes, and Ingold, Nature, volume 158, page 480 (1946).

The method described above can be exemplified by reference to the following specific example, given by way of illustration.

Example 1

A quantity of 70 percent $HClO_4$ was added dropwise to a vessel containing excess $P_2O_5$ cooled to a temperature of $-78°$ C. in a cooling bath. On addition, the perchloric acid froze on the inside of the cold reaction vessel. Overnight, the reaction between the acid and phosphorus pentoxide took place slowly as the temperature of the vessel rose due to gradual loss of the cooling bath.

The chlorine heptoxide generated in this reaction was vacuum distilled at a pressure of 1–2 mm. Hg at 40–42° C. into 100 percent $HNO_3$ (anhydrous) which had been cooled to $-78°$ C. A white solid formed. The solid was purified by sublimation under vacuum.

In the generation of chlorine heptoxide, any fairly good grade of perchloric acid may be employed. The chlorine heptoxide may be reacted with red fuming nitric acid as well as with anhydrous 100 percent $HNO_3$.

If nitryl perchlorate is desired in predominant amount, phosphorus pentoxide is added to the $HNO_3$ before addition of chlorine heptoxide thereto.

Although specific embodiments have been shown and described, it is to be understood that they are illustrative, and are not to be construed as limiting the scope and spirit of the invention.

What is claimed is:
1. The method of making a mixture consisting of a predominant portion of nitryl perchlorate in admixture with nitrosyl perchlorate which comprises contacting anhydrous nitric acid, at a temperature up to room temperature and under anhydrous conditions, with chlorine heptoxide to produce a solid product comprising said mixture of perchlorates, and then recovering said mixture of perchlorates from said solid product.
2. The method as in claim 1 wherein one molar part of nitric acid is reacted with at least one molar part of chlorine heptoxide, whereby the content of nitryl perchlorate in said mixture is increased.
3. The method as in claim 1 wherein nitric acid and chlorine heptoxide are contacted in the presence of phosphorus pentoxide, whereby the content of nitryl perchlorate in said mixture is increased.

References Cited by the Examiner

Goddard et al., "Nature," vol. 158, page 480 (1946).
Gordon et al., "Canadian J. of Research," vol. 18B, pages 358–362 (1940).
Hantzsch, "Berichte," vol. 58B, pages 941–961 (1925).
Mellor, "Comprehensive Treatise on Inorganic and Theoretical Chemistry," vol. 2, page 380 (1922).

MAURICE A. BRINDISI, *Primary Examiner.*
CARL D. QUARFORTH, OSCAR R. VERTIZ,
*Examiners.*